Figure 1:
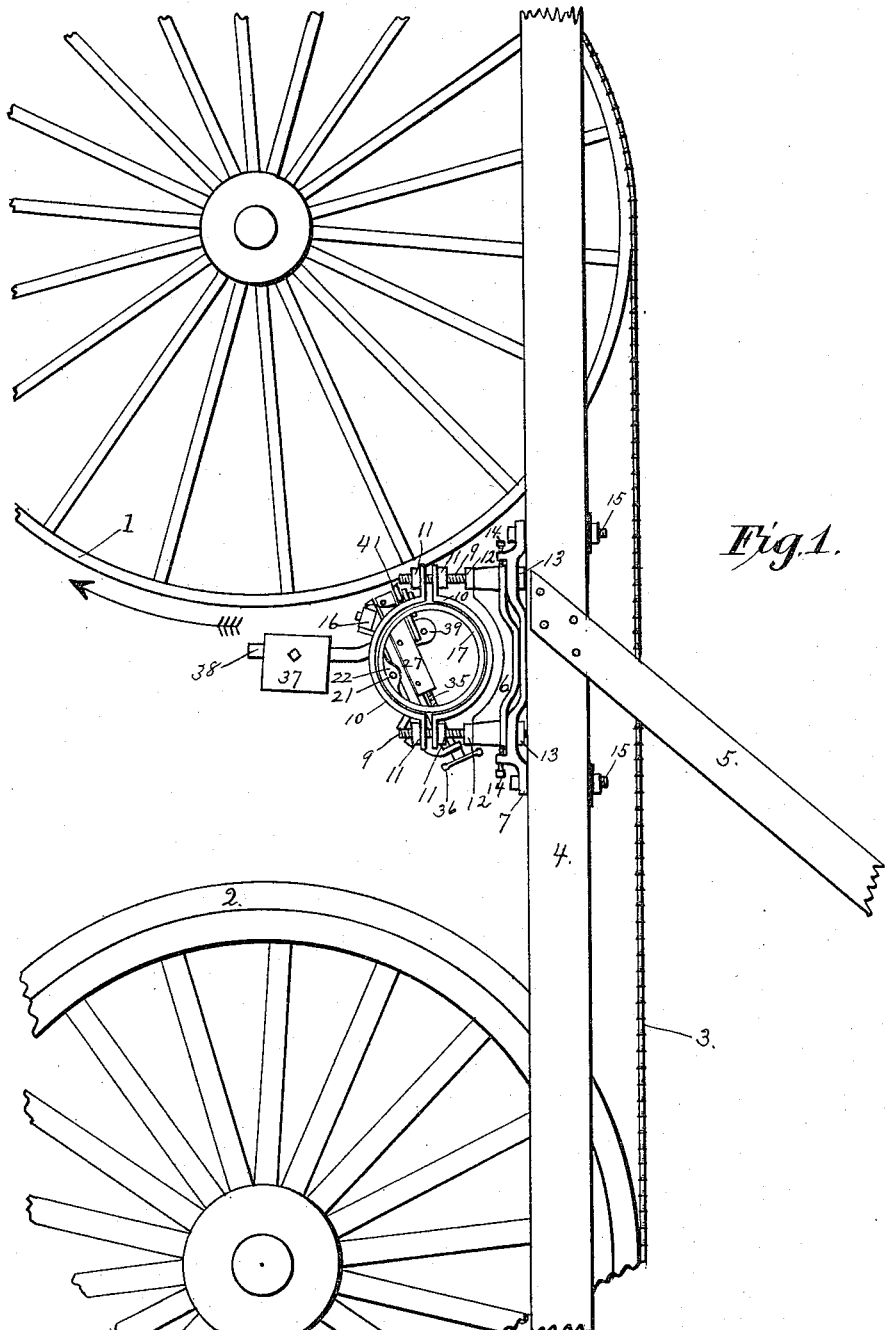

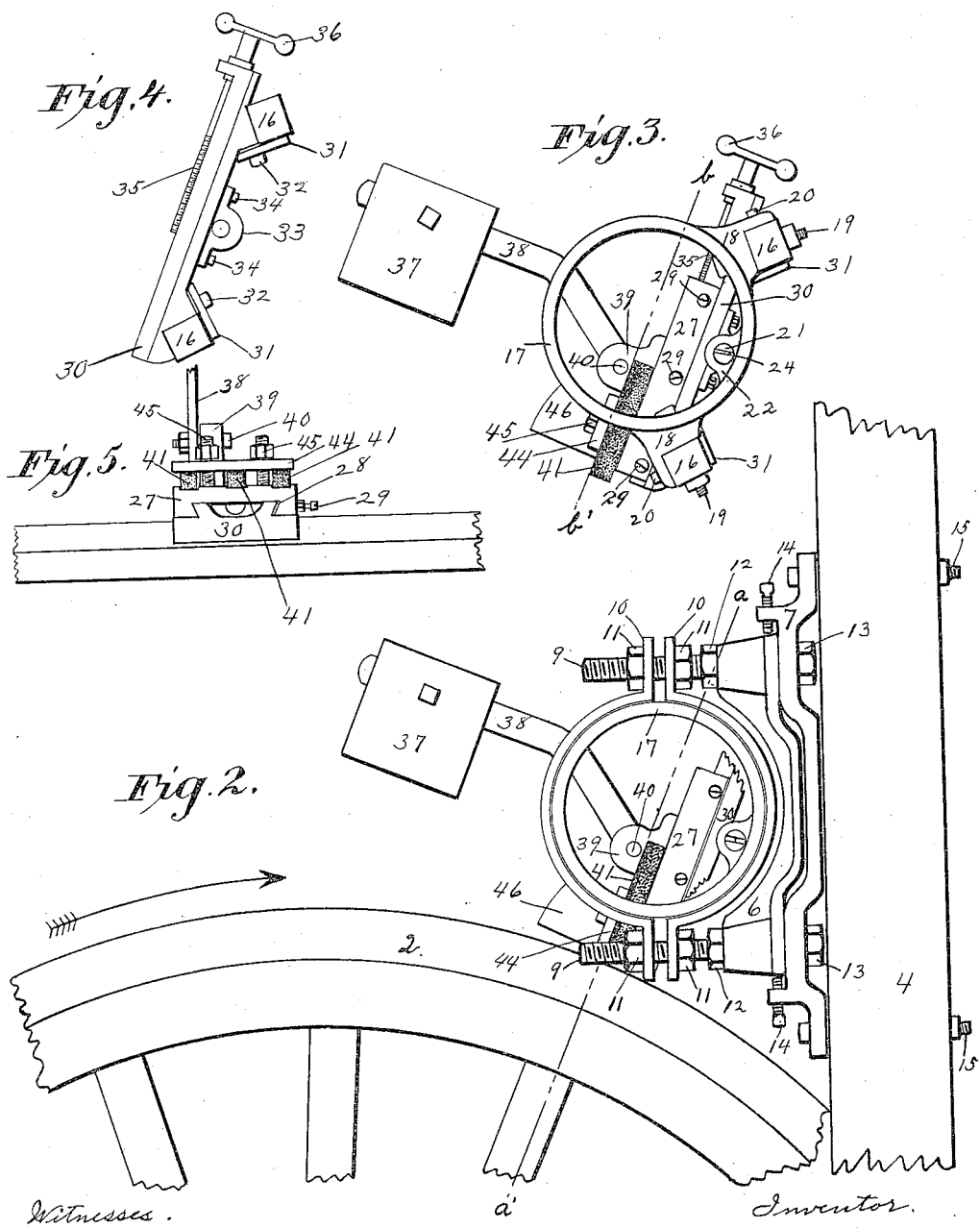

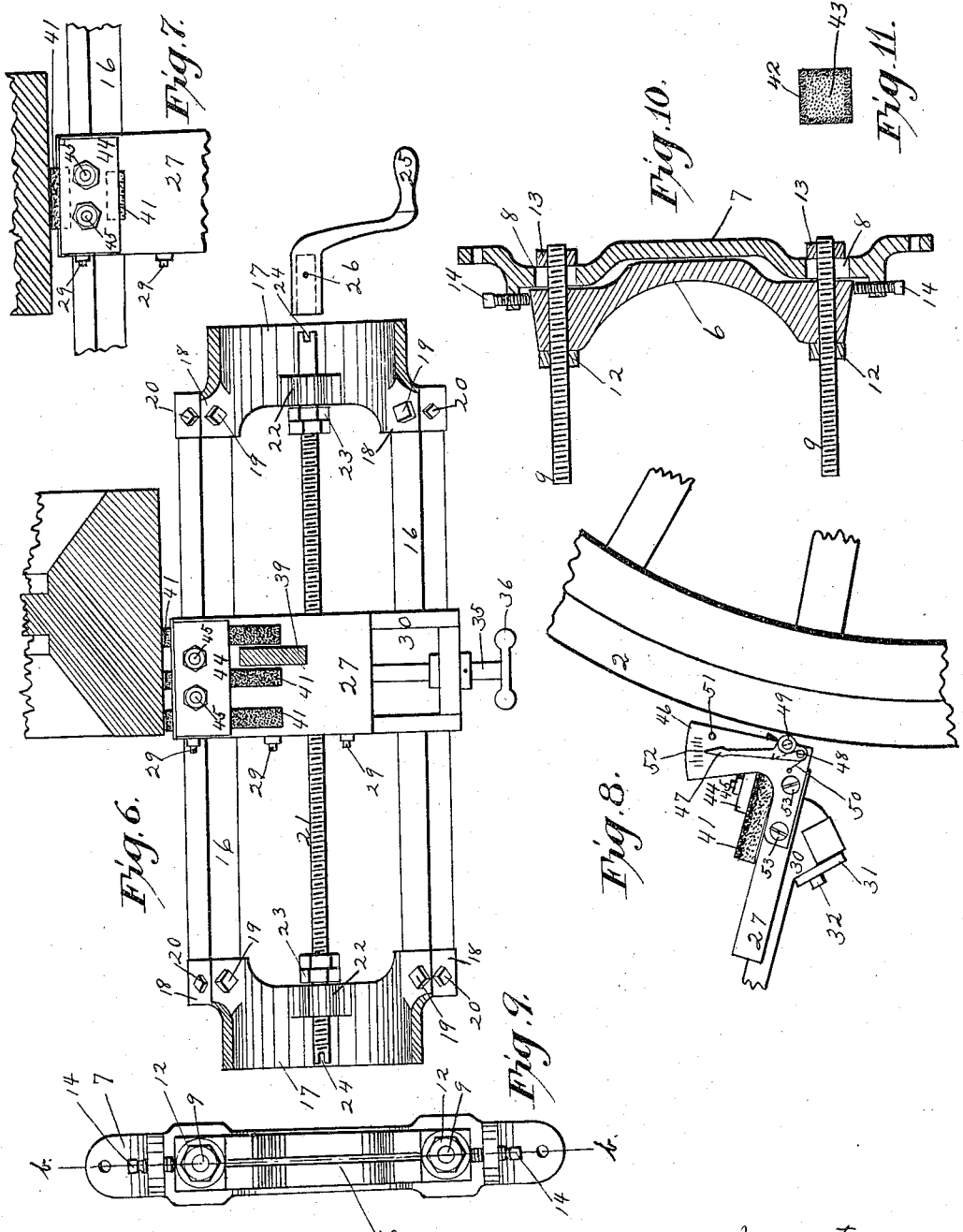

UNITED STATES PATENT OFFICE.

WILLIAM RICHARD ANTHONY, OF MEMPHIS, TENNESSEE.

MACHINE FOR TRUING FACED WHEELS OR PULLEYS.

1,148,563.

Specification of Letters Patent.   Patented Aug. 3, 1915.

Application filed September 22, 1913.   Serial No. 791,160.

*To all whom it may concern:*

Be it known that I, WILLIAM RICHARD ANTHONY, residing in Memphis, in the county of Shelby, State of Tennessee, have invented certain new and useful Improvements in a Means for Truing Faced Wheels or Pulleys.

The object of this invention is to provide a simple and efficient means for scraping off, at a high rate of speed, the objectionable elevations in such untrue surface, leaving the face in exact conformity to required specifications, without undue friction in the operation or without unnecessary consumption of power or time, thus combining increased efficiency with reduction in cost.

The distinctive construction and the means employed may be well understood by referring to the accompanying three sheets of drawing in which similar reference numerals indicate corresponding parts.

Figure 1 is an end elevation of my machine attached in working position to the top wheel of a band saw mill; Fig. 2 is a corresponding end elevation of my machine attached to the bottom wheel of a band saw mill; Fig. 3 is a corresponding end elevation of the machine with the supporting brackets removed; Fig. 4 is a corresponding end view showing only the details of carriage construction; Fig. 5 is a detail side view showing an arrangement of the scraping tools; Fig. 6 is a longitudinal section upon lines $a\,a'$ of Fig. 2, showing in detail the body of my machine with the supporting brackets removed; Fig. 7 is a corresponding sectional view of a detail showing a different arrangement of the scraping tools; Fig. 8 is a detail elevation in opposite view from Fig. 2, showing the wheel tester attached to a portion of the carriage and its relative position toward the face of the band wheel; Fig. 9 is a view in elevation of one of the supporting brackets with the ring clamps removed; Fig. 10 is a central vertical section upon lines $b\,b'$ of Fig. 9; and Fig. 11 is an end elevation of one of the scraping tools.

The special adaptability of my invention to the rim faces of the wheels of band saw mills, as herein illustrated, is due to the fact that these wheels wear and require to be accurately refaced very frequently, and to the fact that in the construction of this machine special economy is attained in its facility for attaching, in the amplitude of its adjustments, in the rigidity of its compactness, and in the time and power required in the act of scraping the wheel faces true to requirements.

This machine may be attached to vertical timbers (4) properly placed with reference to the peculiar design of the band mill so that it may be moved up to the top wheel (1) or down to the bottom wheel (2) with very little preparation. Or where this arrangement is impossible the machine may just as easily be attached to oblique or horizontal timbers, or even to one vertical and the other horizontal or oblique, as may be easily understood from the accompanying description. In any case the timbers must be rigidly braced, see 5 Fig. 1, to prevent vibration.

As shown in Figs. 1 and 2, the machine is attached to the supporting timbers (4) by bolts (15) passing through holes in the ends of the containing plates (7) which supports the yoke (6) by means of the studs (9) passing through the slots (8), see Fig. 10, and tightened in position by the nuts (13), the studs (9) being threaded into each end of the yoke (6) and locked from farther turning therein by the nuts (12). The hanger yoke (6) is vertically adjustable upon the containing plate (7), after loosening the nuts (13), by means of the adjustment screws (14), the studs (9) passing freely through the elongated slots (8).

The end supports of the machine frame being in the form of rings (17) are revoluble to any position within the circle, and are clamped in the desired position by the ring clamps (10) at each end which are tightened by the two nuts (11) upon each stud (9). Besides tightening these ring clamps (10) upon the rings (17), these nuts (11) afford ample lateral adjustment so that by means of this lateral adjustment and the vertical adjustment effected by the screws (14) the body of the machine may easily be alined to the desired position without undue care and unnecessary time spent in setting the supporting timbers, see Fig. 2. The main frame of the machine which has these end ring supports (17) comprises two parallel bars (16) of finished steel, or other suitable material, which bars are preferably rectangular or square, and are placed alike so that one corner of each approaches that of the other in the direction of its nearest distance, leaving each bar stiffest in the directions known to be subject to greatest vibration. These parallel slide bars (16) are attached to the end ring supports (17) by means of the corresponding lugs (18) through which the bolts (19) are fitted, and for additional strength the screws (20) tighten in a direction at right angle from the bolts (19), see Fig. 3. These parallel bars (16) form the slides upon which the carriage base (30) travels by means of the longitudinal feed screw (21) which is journaled at (22) inside each end ring and provided with adjustable end thrust nuts and jam nuts (23), being turned by the handle crank (25) which slips over either end of the feed screw engaging the end slot (24) by the pin (26) which crosses the cylindrical opening in the handle, see Fig. 6. This longitudinal feed screw (21) is connected with the carriage base (30) by means of the nut (33) secured to the carriage base (30) by the screws (34), see Fig. 4, and this carriage base (30) being properly fitted upon the slide bars (16) is also provided with the gib plates (31) secured to the carriage base by means of the screws (32) so as to take up all lost motion between the carriage base and the slide bars. Upon this carriage base (30) is mounted the cross feed carriage (27), see Figs. 5 and 6, which is suitably fitted to slide thereon with gib (28) and gib takeup screws (29) to prevent lost motion between the carriage and its base. This cross feed carriage is caused to slide in its path by means of the cross feed screw (35) being turned by a handle (36) and threaded into the under side of the carriage (27). Upon this carriage is held one or more scraping tool, or tools, (41) firmly clamped in position by the plate (44) and the bolts (45), or other suitable means, see Figs. 6 and 7. These scraping tools (41) may be used singly or in series with one corner of one end of each presented to the work see Figs. 2 and 6, or they may be so used as to present one corner of one side to do the scraping, as shown in Fig. 7. These scraping tools may be composed of any hard substance capable of withstanding the heat, but preferably an artificial stone or composition of very hard crystals united by a suitable bond so as to present a very hard and tough outer surface (42) with a more porous and softer interior (43), as represented in Fig. 11, is herein selected, in order that the hard corner exposes to the work may perform the work of scraping while the soft interior wears away without producing undue friction. These scraping tools may be turned or used interchangeably for the purpose of equalizing wear. In order to overcome vibration from the work of scraping this carriage (27) is provided with a projecting lug (39) to which is adjustably fastened a lever (38) by a bolt (40), which lever carries a weight (37), which weight overcomes any possible lost motion that may not be entirely taken up by the carriage gibs, see Figs. 1, 2, 3, 5 and 6.

Whether the wheel's surface is to be tested in its worn and untrue condition or in its finished condition it may be accurately done by the means shown in Fig. 8. This tester is detachably fastened to one side of the cross carriage (27) by the screws (33) passing through holes in the tester plate (46). Upon this plate (46) an indicating hand (47) is pivoted at (48) with a hardened bearing (49) held in close contact with the wheel's surface by the spring (50), this indicator hand being prevented from traveling too far toward the wheel by a limit stop (51), and the point of this indicator hand (47) is caused to traverse the graduation marks (52) by the action of the unevenness of the wheel's surface upon this hard contact (49). This indicator hand (47) being proportioned so as to magnify the defects make them very easy to ascertain, and in this way enable the operator to do much closer work.

In the use of this machine simply bolt the hanger brackets to any suitable fastening, preferably to a vertical timber as shown in Figs. 1 and 2, so that the scraping tools will come in contact with the face of the wheel. By means of the ring clamps (10) fasten the machine in a position that will make the top of the scraping tools line away from the center of the band wheel so as to expose only one cutting or scraping corner of the tool, or tools, and not the square end of the tool, to the wheel's face. Then aline the machine with the wheel in the desired position by means of the vertical adjustment screws (14) at either end and by the lateral adjustments obtainable by the nuts (11) upon the studs (9). Set the weight (37) and lever (38) in a position that will hold the carriage firmly in the direction the wheel turns. Place the tester on the carriage as herein explained and run the wheel very slowly to ascertain whether or not it is round, and move the carriage across the wheel's face by the longitudinal feed screw turned by the crank (25) and the tester hand will indicate all the ridges and valleys to be worked out. Then the tester may be removed and the scraping tools inserted, preferably three at once with their end corners exposed to the wheel's face until the work of truing is nearly completed then insert only one tool in the same position, and finally for finish insert one tool crosswise as shown in Fig. 7. The tester may then be again used to verify the accuracy of the finish. Band wheels thus trued should make a rim speed of about one thousand to fifteen hundred feet per minute, the lower wheel being driven by its belt and the upper one by the saw (3), the tooth edge being boxed in for safety.

Having thus fully described my invention and its practical application, what I claim as original and desire to protect by Letters Patent is,

1. A wheel truing attachment with one or more scraping tools securable in various positions upon a traveling carriage by a clamp having only one fixed position relative to the direction of travel of said carriage, this carriage in its base being longitudinally slidable upon a frame with ends provided for rotary contact with end supports arranged to impart to the ends of said machine screw adjustments for vertical and horizontal changes of position, and means for securing these end supports to suitable places for attachment.

2. A combination, in a device as herein shown and described, of one or more scraping tools of hard material each held securely upon the tool carriage with one corner in cutting contact with the face of the wheel, said tool carriage having means for adjusting said scraping tool or tools to and from the wheel, means for causing it to travel at will across said wheel, means for overcoming vibration in said tool carriage by adjustment of a weight upon a lever attached to said tool carriage, means for rotatably adjusting the position of the scraping tool in any direction within a complete revolution, means for independently alining either end of the machine in a vertical or a horizontal position, and means for supporting each end of the machine independently to objects in like or unlike positions.

3. In a device for the purpose herein specified two independent end supporting brackets each having a containing plate with means for securing it in a stationary position, and upon this containing plate, in the same general line with it, a bar or yoke mounted to slide thereon with adjustment screws to determine said slidable position, this yoke to be clamped against the containing plate by means of two stud bolts secured into opposite ends of the yoke and passing through slots in the containing plate with nuts upon said stud bolts behind said containing plate, these stud bolts also carrying nuts which provide adjustment toward and from the containing plate of the means for effecting a rotary contact of each bracket with the round ends of the machine frame comprising two oblique rectangular slide bars which convey a carriage base slidable upon them, this carriage base having slidably mounted upon it a cross feed carriage upon which are clamped one or more scraping tools in a manner to present either a side corner or an end corner of said tools in cutting contact with the face of a revolving wheel.

4. In a machine for truing the worn faces of wheel rims as herein shown and described, one or more scraping tools of any hard material strongly bound and hardened in their outer extremities with their cores, or interior, each composed of a filler of softer or more porous material, said tools being firmly clamped upon a traveling carriage so as to present the hard cutting corners, either of the end of the tools or of the side of same, toward or in contact with the wheel's surface to be trued, said traveling carriage being provided with a detachable lever carrying an adjustable weight for counteracting vibrations therein, said traveling carriage also being fitted to slide upon parallel bars of square or rectangular material positioned diagonally so as to present the sectional hypothenuse of each in the directions known to be subject to greatest vibration, these diagonal slides being joined at each end by ring shaped supports of like positions in common axes, said rings being independently clamped by ring clamps comprising bands screwed together in connection with supporting brackets with vertical and horizontal adjustments.

5. The combination, in a band wheel scraping machine, of one or more tools having hardened corners and in each a core of soft material, these tools being so clamped upon a cross sliding carriage that any cutting corner of any tool may be firmly held in scraping contact with the face of a revolving wheel, this cross sliding carriage being provided with a detachable lever carrying a weight for counteracting vibration therein, also a cross feed screw threaded into a portion of this carriage and connecting with a portion of the base carrying said carriage, this carriage base being slidably mounted upon parallel bars of rectangular shape, diagonally positioned so as to present one corner of each toward that of the other in the direction of the nearest distance across, or similar variations of this construction, these slide bars being attached to round ends of common axes, these round ends each having a rotatable contact with a clamping means within its supporting bracket.

6. In a band wheel refacing machine, the combination comprising two detachable end supporting brackets provided with opposing screw adjustments within said brackets for vertical and horizontal changes of alinement to the ends of said machine, said brackets also being provided with means as herein shown, or consistent variations of this construction, for detachable rotary clamping contact with the round ends of said machine permitting the brackets being secured in like or unlike positions, these round ends being joined to diagonal slide bars and parallel to these a longitudinal feed screw, journaled inside of these ring or flange shaped ends, with endthrust take-up nuts and jam nuts, and slots in each end of said feed screw to be engaged by a pin crossing the cylindrical opening of an interchangeable handle crank, said feed screw having threaded connection with the base of a carriage holding scrapers of hard material in their outer surface with cores of soft, erasive, and non-abrasive material.

WILLIAM RICHARD ANTHONY.

Witnesses:
 M. SLAUGHTER,
 H. M. TAYLOR.

Copies of this patent may be obtained for five cents each, by addressing the "Commissioner of Patents Washington, D. C."